United States Patent
Huang et al.

(10) Patent No.: US 8,978,040 B2
(45) Date of Patent: Mar. 10, 2015

(54) METHOD AND SYSTEM ENABLING CO-OPERATING OF WEB APPARATUS AND FLASH APPARATUS

(75) Inventors: Chaoxing Huang, Shenzhen (CN); Bijian Guo, Shenzhen (CN); Xinqi Zhu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 511 days.

(21) Appl. No.: 13/407,965

(22) Filed: Feb. 29, 2012

(65) Prior Publication Data

US 2012/0159346 A1      Jun. 21, 2012

Related U.S. Application Data

(63) Continuation of application No. PCT/CN2010/075735, filed on Aug. 5, 2010.

(30) Foreign Application Priority Data

Sep. 21, 2009   (CN) .......................... 2009 1 0177813

(51) Int. Cl.
   *G06F 13/00*   (2006.01)
   *H04L 29/08*   (2006.01)
   *H04L 29/06*   (2006.01)

(52) U.S. Cl.
   CPC ............... *H04L 67/02* (2013.01); *H04L 67/40* (2013.01)
   USPC .......................................... 719/311; 719/330

(58) Field of Classification Search
   CPC ........................................................ G06F 9/547
   USPC .................................................. 719/311, 330
   See application file for complete search history.

(56) References Cited

U.S. PATENT DOCUMENTS

| | | | |
|---|---|---|---|
| 8,131,851 B2 * | 3/2012 | Harlow .......................... | 709/224 |
| 8,296,357 B2 * | 10/2012 | Stone et al. .................... | 709/203 |
| 2007/0273754 A1 | 11/2007 | Cockerton et al. | |
| 2008/0005173 A1 | 1/2008 | Wilson et al. | |
| 2008/0222262 A1 | 9/2008 | Oh et al. | |
| 2009/0259926 A1 * | 10/2009 | Deliyannis .................... | 715/205 |

FOREIGN PATENT DOCUMENTS

| | | |
|---|---|---|
| CN | 101057237 A | 10/2007 |
| CN | 101089811 A | 12/2007 |
| CN | 101188620 A | 5/2008 |
| CN | 101360109 A | 2/2009 |

OTHER PUBLICATIONS

International Search Report for PCT/CN2010/075735 dated Nov. 11, 2010.
Canadian Office Action for Application No. 2 773 784, dated Apr. 8, 2014.
Russian Office Action for Application No. 2012116163, dated Jul. 24, 2013.

* cited by examiner

*Primary Examiner* — Andy Ho
(74) *Attorney, Agent, or Firm* — Marshall, Gerstein & Borun LLP

(57) ABSTRACT

Embodiments of the present invention relate to network communications, and provide a method and a system enabling co-operating of a web apparatus and a flash apparatus. The method includes: a web apparatus sends an instruction of calling a flash apparatus to a client, where the instruction includes information of the flash apparatus to be called; after receiving the instruction, the client makes a flash control perform an operation based on information of the flash apparatus to be called in the instruction. The system includes a web apparatus, a flash apparatus and a client. The flash apparatus and the web apparatus are capable of calling each other and are at the same status in the client, thus respective functions can be fully utilized. The flash apparatus and the web apparatus are capable of accessing resources of the client directly, which improves the access efficiency.

8 Claims, 2 Drawing Sheets

METHOD AND SYSTEM ENABLING CO-OPERATING OF WEB APPARATUS AND FLASH APPARATUS

CROSS-REFERENCE TO RELATED APPLICATION

This is a continuation of International Application No. PCT/CN2010/075735, filed on Aug. 5, 2010, which claims priority to Chinese Patent Application No. 200910177813.7, filed on Sep. 21, 2009, the entire respective disclosures of which are hereby incorporated by reference.

TECHNICAL FIELD

The present invention relates to network communications, and particularly, to a method and a system enabling co-operating of a web apparatus and a flash apparatus.

BACKGROUND web is a hyper-text information system which makes texts no longer in fixed and sequential order as in a book but capable of skipping from a position to another. When a user wants to know more about a topic, the user only needs to click on the topic to be diverted to a document having the topic for more information. The multi-linkage feature is referred to as web, and an apparatus implementing web functions is referred to as a web apparatus.

In currently prevailing Internet, flash has become one of popular visual arts. flash files are small in size, and take fewer time for development and transmission. Further more, flash combines various fashionable elements such as network, music, animation, acoustic effects, interaction, etc., thus implements perfect integration of techniques and arts. A flash apparatus serves as a 2D platform and a script execution platform, thus has advantages in executing script. But resource management functions and access to local computer resources of flash are restricted due to security reasons. An apparatus implementing flash functions is referred to as a flash apparatus.

For integrating functions of flash and web, a conventional solution enabling co-operating of a web apparatus and a flash apparatus embeds a flash apparatus into a web apparatus to integrate the flash apparatus and the web apparatus.

In the infrastructure where the flash apparatus is embedded into the web apparatus, however, the flash apparatus needs to inform a client via a javascript function of the web apparatus when the flash apparatus attempts to access resources in the client. Since the access request needs to be forwarded by the web apparatus, the flash apparatus and the web apparatus has low co-operation efficiency.

SUMMARY

Embodiments of the present invention provide a method and a system enabling co-operating of a web apparatus and a flash apparatus. The technical schemes are as follows.

A method enabling co-operating of a web apparatus and a flash apparatus may include:
a web apparatus sends an instruction of calling a flash apparatus to a client, wherein the instruction includes information of the flash apparatus to be called;
a flash control in the client performs an operation based on the information of the flash apparatus to be called in the instruction after the client receives the instruction.

A method enabling co-operating of a web apparatus and a flash apparatus may include:
a flash apparatus sends an instruction of calling a web apparatus to a client, wherein the instruction includes information of the web apparatus to be called;
a web control in the client performs an operation based on the information of the web apparatus to be called in the instruction after the client receives the instruction.

A system enabling co-operating of a web apparatus and a flash apparatus may include:
a web apparatus, for sending an instruction of calling a flash apparatus to a client, wherein the instruction includes information of the flash apparatus to be called;
the client, is for receiving the instruction, and a flash control in the client performs an operation based on the information of the flash apparatus to be called in the instruction.

Embodiments of the present invention have advantages of: the flash apparatus and the web apparatus can call each other which puts the flash apparatus and the web apparatus at the same position in the client, thus can fully utilize respective functions, and the flash apparatus and the web apparatus can access resources in the client directly thus improve the access efficiency.

DETAILED DESCRIPTION

Embodiments are hereinafter described in details with reference to the accompanying drawings to make the objective, technical scheme and merits of the present invention more apparent.

Embodiment One

Figure 1:
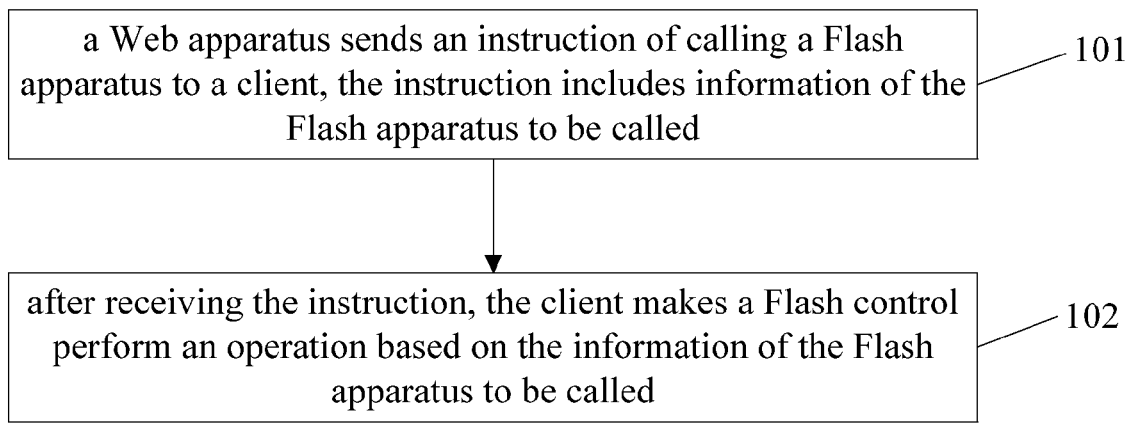
FIG. 1 is a flowchart illustrating a method enabling co-operating of a web apparatus and a flash apparatus according to embodiment one of the present invention.

As shown in FIG. 1, embodiments of the present invention provide a method enabling co-operating of a web apparatus and a flash apparatus. The method may include the following procedures.

In block 101, a web apparatus sends an instruction of calling a flash apparatus to a client, wherein the instruction includes information of the flash apparatus to be called.

The information of the flash apparatus to be called includes a name of the flash control to be called, a name of an action script (as) function and a parameter of the as function.

In block 102, after the client receives the instruction, a flash control in the client performs an operation based on information of the flash apparatus to be called.

It should be noted that the client may be program codes or a computer running an operating system.

In conventional art, since the flash apparatus and the web apparatus are integrated by embedding the flash apparatus into the web apparatus, the flash apparatus has to send an access request via the web apparatus for accessing resources in the client, thus the access efficiency is low. In contrast, in this embodiment, the web apparatus and the flash apparatus are capable of calling each other by making the client forward a calling instruction. The web apparatus and the flash apparatus are integrated into the client with the same status, and this structure is different from that in the conventional art. According to the present invention, the flash apparatus can directly access resources in the client without relying on the forwarding of the web apparatus, thus the efficiency is greatly improved.

The flash control in the client performs the operation based on the information of the flash apparatus to be called specifically includes:

performing the operation utilizing the parameter of the as function based on the name of the flash control, the as function corresponding to the flash control to be called in the information of the flash apparatus to be called.

Before the web apparatus sends the instruction, the method may further include:

the web apparatus, the client and the flash apparatus perform initiation respectively.

Specifically, the client establishes and names a web control in the web apparatus, the web control loads a javascript function; the client establishes and names a flash control in the flash apparatus, and the flash control loads a flash file.

Preferably, the method may specifically include:

the web apparatus may call the client, and the client may call the web apparatus.

Specifically, the client registers an ID for each function, and obtains a mapping relation between the name of the function and the ID. When the web apparatus needs to call a function in the client, the function corresponding to the ID is called by utilizing the mapping relation.

When the client needs to call a function configured in the web apparatus, the client obtains the ID of the function by utilizing the mapping relation, and calls the function by utilizing the ID of the function. Detailed process of the calling is the same with that in the conventional art, and will not be described further herein.

Preferably, the method may further include:

the flash apparatus may call the client, and the client may call the flash apparatus.

Specifically, the flash apparatus calls a function in the client by calling an external interface of the function.

The client calls a function in the flash apparatus by calling an external interface of the function provided by the flash apparatus, and detailed calling process is the same with that in the conventional art and will not be described further herein.

It should be noted that there is no fixed time order of the web apparatus calls the client, the client calls the web apparatus, the flash apparatus calls the client, the client calls the flash apparatus and the web apparatus calls the flash apparatus, and they can be performed before or after or when the web apparatus and the flash apparatus are called.

The following description takes a flash apparatus serving as a 2D presenting engine of a community and a web apparatus serving as a shopping mall and other application webpage providing platform as an example to illustrate the implementation of embodiments of the present invention in detail. Firstly, a client establishes a flash control, and the flash control loads a flash file including logic of a community; the client establishes a web control, and the web control loads web content. The client performs resource management and network communication.

Suppose a user of the client wants to buy a dress in a web-based shopping mall for an avatar in an animation presented by the flash apparatus. The web apparatus sends an instruction to the client for changing the clothes of the avatar in the animation presented by the flash apparatus, i.e., making the avatar put on the dress bought from the web-based shopping mall. After receiving the instruction, the client calls a flash control based on a name of a flash control to be called, a name of an as function corresponding to the flash control and a parameter of the as function in the instruction. The flash control corresponding to the name of the flash control to be called is a control for changing clothes, and the as function corresponding to the name of the as function is a function for changing clothes. The as function is called and performs a clothes-changing operation by utilizing the parameter of the as function. After the as function is called, the clothes of the avatar is changed. The flash apparatus sends a request to the client for downloading resources of the clothes. After the resources of the clothes are downloaded, the flash apparatus presents the avatar with the downloaded clothes.

In the above situation, the web apparatus and the flash apparatus respectively communicate with the client directly, i.e., the web apparatus and the flash apparatus are at the same status in the client, the flash apparatus does not have to rely on the web apparatus for communicating with the client but can directly communicate with the client. If the flash apparatus is embedded into the web apparatus, the flash apparatus has to request for resources from the client via the web apparatus, which lowers the efficiency. In contrast, the flash apparatus in embodiments of the present invention requests resources from the client directly, thus the efficiency is improved.

Embodiments of the present invention have advantages of: the flash apparatus and the web apparatus call each other via the client, and have the same status in the client, which can fully utilize capabilities of the apparatuses. Compared with the conventional art where the flash apparatus is embedded into the web apparatus and accesses resources of the client via a javascript function in the web apparatus, the flash apparatus and the web apparatus of embodiments can directly access resources of the client, thus the access efficiency is improved.

The web apparatus and the client may also call each other, and the web apparatus may use all resources of the client and communicate with a Socket server via the client. The client may download and update web resources to the client. The flash apparatus and the client may also call each other, and the flash apparatus may use all resources of the client and communicate with the Socket server via the client. The client may download flash swf files to the client to update the logic without having to update the platform on which the client is running. Through calling each other by the flash apparatus and the client, restrictions on the resource management and local rights (e.g., writing a file) of the flash apparatus can be solved.

Embodiment Two

Figure 2:
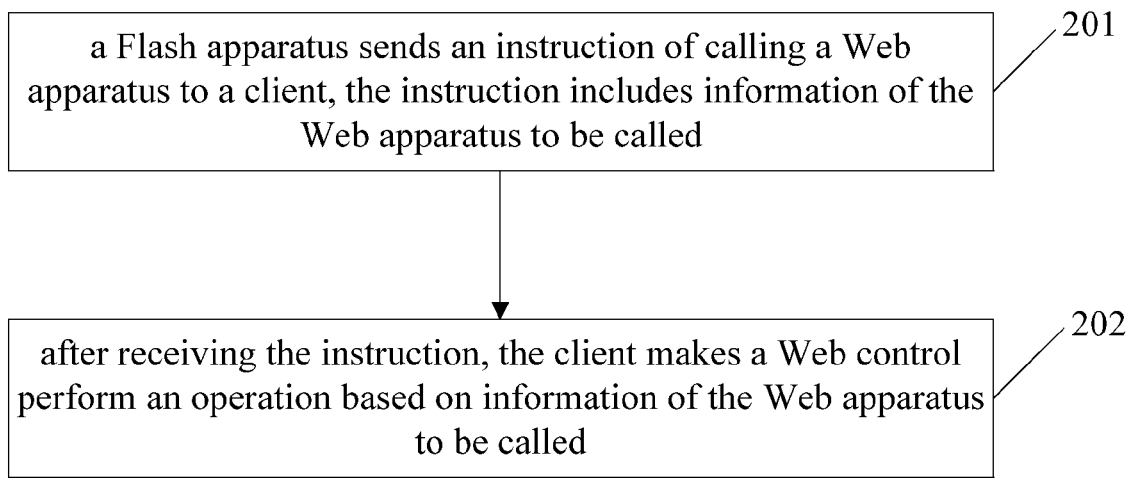
FIG. 2 is a flowchart illustrating a method enabling co-operating of a web apparatus and a flash apparatus according to embodiment two of the present invention.

As shown in FIG. 2, embodiments of the present invention provide a method enabling co-operating of a web apparatus and a flash apparatus. The method may include the following procedures.

In block 201, a flash apparatus sends an instruction of calling a web apparatus to a client, wherein the instruction includes information of the web apparatus to be called.

The information of the web apparatus to be called may include a name of a web control to be called, a name of a javascript function and a parameter of the javascript function.

In block 202, after the client receives the instruction, a web control in the client performs an operation based on information of the web apparatus to be called.

In conventional art, since the flash apparatus is embedded into the web apparatus, when the flash apparatus needs to access resources of the client, the flash apparatus needs to make the web apparatus forward an access request of the flash apparatus, thus the efficiency is low. According to embodiments of the present invention, the web apparatus and the flash apparatus have the same status in the client after being integrated into the client. According to the present invention, the flash apparatus can directly access resources in the client without relying on the forwarding of the web apparatus, thus the efficiency is greatly improved.

The web control in the client performs the operation based on the information of the web apparatus to be called specifically includes:

the javascript function corresponding to the web control is called based on the name of the web control in the information of the web apparatus to be called, and the javascript function performs the operation utilizing the parameter of the javascript function.

Before the flash apparatus sends the instruction to the web apparatus, the method may further include:

the web apparatus, the client and the flash apparatus perform initiation respectively.

Specifically, the client establishes and names a web control in the web apparatus, and the web control loads a javascript function; the client establishes and names a flash control in the flash apparatus, and the flash control loads a flash file.

Preferably, the method may further include:

the web apparatus may call the client, and the client may call the web apparatus.

Preferably, the method may further include:

the flash apparatus may call the client, and the client may call the flash apparatus.

The process of the flash apparatus calls the web apparatus is the similar with that in embodiment one, and will not be described further herein.

Embodiments of the present invention have advantages of: the flash apparatus and the web apparatus can call each other which puts the flash apparatus and the web apparatus at the same position in the client, thus can fully utilize respective functions, and the flash apparatus and the web apparatus can access resources in the client directly. In conventional art where the flash apparatus is embedded into the web apparatus, the flash apparatus relies on a javascript function in the web apparatus for accessing resources of the client. According to the present invention, the flash apparatus may directly access resources of the client, which greatly improves efficiency.

The web apparatus and the client may also call each other, and the web apparatus may use all resources of the client and communicate with a Socket server via the client. The client may download and update web resources to the client. The flash apparatus and the client may also call each other, and the flash apparatus may use all resources of the client and communicate with the Socket server via the client. The client may download flash swf files to the client to update the logic without having to update the platform on which the client is running. Through calling each other by the flash apparatus and the client, restrictions on the resource management and local rights (e.g., writing a file) of the flash apparatus can be solved.

Embodiment Three

Figure 3:
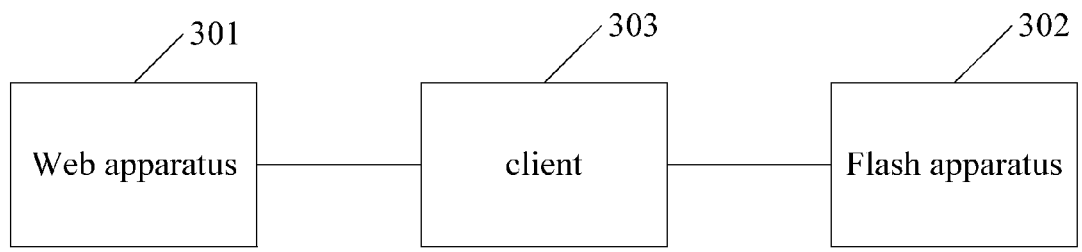
FIG. 3 is a schematic illustrating a structure of a system enabling co-operating of a web apparatus and a flash apparatus according to embodiments three and four of the present invention.

As shown in FIG. 3, embodiments of the present invention provide a system enabling co-operating of a web apparatus and a flash apparatus. The system may include: a web apparatus 301, a flash apparatus 302 and a client 303.

The web apparatus 301 is for sending an instruction of calling the flash apparatus 302 to the client 303, wherein the instruction includes information of the flash apparatus to be called.

The information of the flash apparatus to be called includes a name of the flash control to be called, a name of an as function and a parameter of the as function.

The client 303 is for receiving the instruction sent by the web apparatus 301, and a flash control in the client performs an operation based on the information of the flash apparatus to be called.

After receiving the instruction sent by the web apparatus 301, the client 303 calls an as function in the flash control based on the name of the flash control in the information of the flash apparatus to be called, and the as function performs the operation by utilizing the parameter of the as function.

The web apparatus 301, the flash apparatus 302 and the client 303 perform initiation respectively before running.

Specifically, the client 303 establishes and names a web control in the web apparatus 301, the web control loads a javascript function; the client 303 establishes and names a flash control in the flash apparatus 302, and the flash control loads a flash file.

Figure 4:
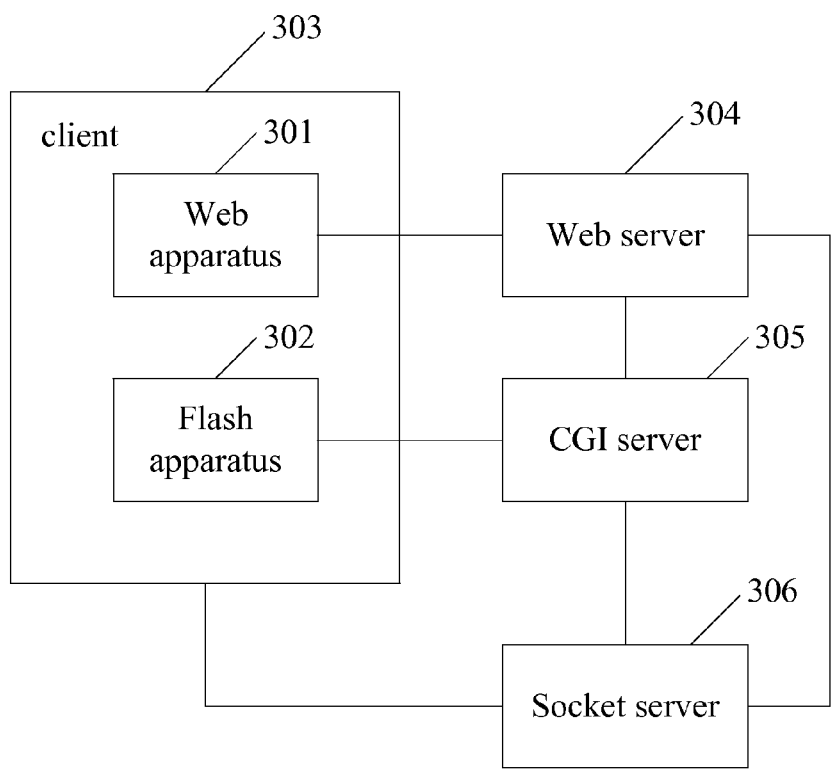
FIG. 4 is a schematic illustrating a structure of a system enabling co-operating of a web apparatus and a flash apparatus according to embodiment three of the present invention.

In this embodiment as shown in FIG. 4, the system may further include a web server 304, a CGI (Common Gateway Interface) server 305 and a Socket server 306.

The web server 304 is for communicating with the web apparatus 301, the CGI server 305 and the Socket server 306.

The CGI server 305 is for communicating with the flash apparatus 302, the web server 304 and the Socket server 306.

The Socket server 306 is for communicating with the client 303, the web server 304 and the CGI server 305.

The web apparatus 301 and the web server 304 communicate with each other using the http protocol and the HTML (HyperText Mark-up Language).

The flash apparatus 302 and the CGI server 305 communicate with each other utilizing the http protocol and XML (Extensible Markup Language).

The client 303 and the Socket server 306 communicate with each other using the tcp/utp protocol.

The web server is for making the web apparatus load a webpage.

The CGI server is for proving a CGI for the flash apparatus and the web apparatus. CGI is program codes running in a network server for communicating with programs in other machines.

The javascript function in the web apparatus and a network communication function in the client communicate with each other via the Socket server; the as function in the flash apparatus and the network communication function in the client communicate with each other via the Socket server.

The web server 304, the CGI server 305 and the Socket server 306 communicate with each other to share data, and to provide the state of the web apparatus 301, the flash apparatus 302 or the client 303 for the servers.

The web apparatus 301 in the system may call the client 303, and the client 303 may call the web apparatus 301.

Specifically, the client 303 registers an ID for each function, and obtains a mapping relation between the name of the function and the ID. When the web apparatus 301 needs to call a function in the client 303, the web apparatus 301 may call the function corresponding to the ID by utilizing the mapping relation.

When the client 303 needs to call a function configured in the web apparatus 301, the client obtains the ID of the function by utilizing the mapping relation, and calls the function by utilizing the ID of the function. Detailed process of the calling is the same with that in the conventional art, and will not be described further herein.

The flash apparatus 302 may call the client 303, and the client 303 may call the flash apparatus 302.

Specifically, the flash apparatus 302 calls a function in the client 303 by calling an external interface of the function.

The client 303 calls a function in the flash apparatus 302 by calling an external interface of the function provided by the flash apparatus 302, and detailed calling process is the same with that in the conventional art and will not be described further herein.

Embodiments of the present invention have advantages of: the flash apparatus and the web apparatus can call each other which puts the flash apparatus and the web apparatus at the same position in the client, thus can fully utilize respective functions, and the flash apparatus and the web apparatus can access resources in the client directly. In conventional art where the flash apparatus is embedded into the web apparatus, the flash apparatus relies on a javascript function in the web apparatus for accessing resources of the client. According to the present invention, the flash apparatus may directly access resources of the client, which greatly improves efficiency.

The web apparatus and the client may also call each other, and the web apparatus may use all resources of the client and communicate with a Socket server via the client. The client may download and update web resources to the client. The flash apparatus and the client may also call each other, and the flash apparatus may use all resources of the client and communicate with the Socket server via the client. The client may download flash swf files to the client to update the logic without having to update the platform on which the client is running. Through calling each other by the flash apparatus and the client, restrictions on the resource management and local rights (e.g., writing a file) of the flash apparatus can be solved.

Embodiment Four

Embodiments of the present invention provide a system enabling co-operating of a web apparatus and a flash apparatus. The system may include: a web apparatus 301, a flash apparatus 302 and a client 303.

The flash apparatus 302 is for sending an instruction of calling the web apparatus 301 to the client 303, and the instruction may include information of the web apparatus to be called.

The information of the web apparatus to be called may include a name of a web control to be called, a name of a javascript function and a parameter of the javascript function.

The client 303 is for receiving the instruction, and a web control in the client performs an operation based on the information of the flash apparatus to be called.

Specifically, the client 303 calls the javascript function corresponding to the web control based on the name of the web control in the information of the web apparatus to be called, and the javascript function performs the operation utilizing the parameter of the javascript function.

The web apparatus 301, the flash apparatus 302 and the client 303 may perform initiation respectively before running.

Specifically, the client 303 establishes and names a web control in the web apparatus 301, and the web control loads a javascript function; the client 303 establishes and names a flash control in the flash apparatus 302, and the flash control loads a flash file.

The web apparatus 301 in the system may call the client 303, and the client 303 may call the web apparatus 301.

The flash apparatus 302 in the system may call the client 303, and the client 303 may call the flash apparatus 302.

Embodiments of the present invention have advantages of: the flash apparatus and the web apparatus can call each other which puts the flash apparatus and the web apparatus at the same position in the client, thus can fully utilize respective functions, and the flash apparatus and the web apparatus can access resources in the client directly. In conventional art where the flash apparatus is embedded into the web apparatus, the flash apparatus relies on a javascript function in the web apparatus for accessing resources of the client. According to the present invention, the flash apparatus may directly access resources of the client, which greatly improves efficiency.

The web apparatus and the client may also call each other, and the web apparatus may use all resources of the client and communicate with a Socket server via the client. The client may download and update web resources to the client. The flash apparatus and the client may also call each other, and the flash apparatus may use all resources of the client and communicate with the Socket server via the client. The client may download flash swf files to the client to update the logic without having to update the platform on which the client is running. Through calling each other by the flash apparatus and the client, restrictions on the resource management and local rights (e.g., writing a file) of the flash apparatus can be solved.

The foregoing is only preferred embodiments of the present invention and is not for use in limiting the present invention. Any modification, equivalent replacement or improvement made under the spirit and principles of the present invention is included in the protection scope thereof.

The invention claimed is:

1. A method enabling co-operating of a web apparatus and a flash apparatus, comprising:
    sending, by a web apparatus using a processor, an instruction to a client for changing clothes of an avatar in an animation presented by a flash apparatus when a user of the client wants to buy a dress for the avatar in a web-based shopping mall presented by the web apparatus, wherein the instruction includes information of the flash apparatus to be called, the information of the flash apparatus to be called comprises a name of a flash control to be called, a name of an as function corresponding to the flash control and a parameter of the as function;
    calling, by the client using a processor, a flash control in the flash apparatus based on the name of the flash control to be called, the name of the as function and the parameter of the as function;
    calling, by the flash control in the client using a processor, the as function corresponding to the flash control according to the name of the flash control in the information of the flash apparatus to be called;
    performing, by the as function using a processor, clothes changing operation by utilizing the parameter of the as function;
    sending, by the flash apparatus using a processor, a request to the client for downloading resources of the clothes; and
    presenting, by the flash apparatus using a processor, the avatar with the downloaded clothes after the resources of the clothes are downloaded by the client.

2. The method of claim 1, further comprising:
sending, by the flash apparatus, a second instruction of calling the web apparatus to the client, wherein the second instruction comprises information of the web apparatus to be called;
performing, by a web control in the client, an operation based on the information of the web apparatus to be called in the second instruction after the client receives the second instruction.

3. The method of claim 2, wherein the information of the web apparatus to be called comprises a name of a web control to be called, a name of a javascript function and a parameter of the javascript.

4. The method of claim 3, wherein the web control in the client performing an operation based on information of the web apparatus to be called in the second instruction comprises:
calling, by the web control in the client, a javascript function corresponding to the web control according to the name of the web control in the information of the web apparatus to be called, and performing, by the javascript function, the operation utilizing the parameter of the javascript function.

5. A system enabling co-operating of a web apparatus and a flash apparatus, comprising:
a web apparatus, for sending an instruction using a processor to a client for changing clothes of an avatar in an animation presented by a flash apparatus when a user of the client wants to buy a dress for the avatar in a web-based shopping mall presented by the web apparatus, wherein the instruction includes information of the flash apparatus to be called, the information of the flash apparatus to be called comprises a name of a flash control to be called, a name of an as function corresponding to the flash control and a parameter of the as function;
the client, is for calling a flash control in the flash apparatus using a processor based on the name of the flash control to be called, the name of the as function and the parameter of the as function; and
the flash control, in the flash apparatus, is for calling the as function corresponding to the flash control using a processor according to the name of the flash control in the information of the flash apparatus to be called;
the as function is for performing a clothes-changing operation using a processor by utilizing the parameter of the as function;
the flash apparatus is for sending a request to the client for downloading resources of the clothes using a processor and for presenting the avatar with the downloaded clothes after the resources of the clothes are downloaded by the client.

6. The system of claim 5, wherein:
the flash apparatus is further for sending a second instruction of calling the web apparatus to the client, wherein the second instruction includes information of the web apparatus to be called;
the client is further for receiving the second instruction, and comprises a web control for performing an operation based on the information of the web apparatus to be called in the second instruction.

7. The system of claim 6, wherein the information of the web apparatus to be called comprises a name of a web control to be called, a name of a javascript function and a parameter of the javascript.

8. The system of claim 7, wherein
the web control in the client is for calling a javascript function corresponding to the web control according to the name of the web control in the information of the web apparatus to be called after the client receives the second instruction, and
the javascript function is for performing the operation according to the parameter.

* * * * *